US007485672B2

(12) United States Patent
Molock et al.

(10) Patent No.: US 7,485,672 B2
(45) Date of Patent: Feb. 3, 2009

(54) PROCESS FOR THE SYNTHESIS OF SOLUBLE, HIGH MOLECULAR WEIGHT POLYMERS

(75) Inventors: Frank Molock, Orange Park, FL (US); David C. Turner, Jacksonville, FL (US); Shivkumar Mahadevan, Orange Park, FL (US); Joseph Hepting, Fort Gratiot, MI (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 147 days.

(21) Appl. No.: 10/968,509

(22) Filed: Oct. 19, 2004

(65) Prior Publication Data

US 2005/0054745 A1 Mar. 10, 2005

Related U.S. Application Data

(63) Continuation-in-part of application No. 09/921,192, filed on Aug. 2, 2001.

(51) Int. Cl.

| | |
|---|---|
| ***C08F 4/46*** | (2006.01) |
| ***C08F 2/50*** | (2006.01) |
| ***C08F 20/06*** | (2006.01) |
| ***C09K 17/22*** | (2006.01) |

(52) U.S. Cl. ...................... 522/182; 522/173; 522/175; 522/178; 522/174; 522/172; 522/168; 522/181; 522/183; 522/153; 522/169; 522/150; 522/151; 522/152; 526/328; 526/328.5; 526/329.5

(58) Field of Classification Search .................. 522/84, 522/85, 86, 178, 182, 175, 173, 150, 153, 522/152, 1, 104, 181, 174, 172, 168, 183, 522/169, 151; 526/246, 328, 328.5, 329.5
See application file for complete search history.

(56) References Cited

U.S. PATENT DOCUMENTS

| | | | | |
|---|---|---|---|---|
| 3,764,502 A | * | 10/1973 | Restaino | 522/182 |
| 3,808,178 A | | 4/1974 | Gaylord et al. | |
| 3,912,607 A | * | 10/1975 | Communal et al. | 522/41 |
| 3,926,756 A | * | 12/1975 | Restaino | 522/84 |
| 3,948,740 A | * | 4/1976 | Phalangas | 522/82 |
| 4,066,522 A | * | 1/1978 | Machi et al. | 522/5 |
| 4,115,339 A | * | 9/1978 | Restaino | 524/814 |
| 4,120,570 A | | 10/1978 | Gaylord | |
| 4,136,250 A | | 1/1979 | Mueller et al. | |
| 4,153,641 A | | 5/1979 | Deichert et al. | |
| 4,178,221 A | * | 12/1979 | Boutin et al. | 522/4 |
| 4,190,277 A | | 2/1980 | England | |
| 4,294,676 A | * | 10/1981 | Boutin et al. | 522/173 |
| 4,325,794 A | * | 4/1982 | Hunter et al. | 522/3 |
| 4,529,782 A | * | 7/1985 | Fan et al. | 526/240 |
| 4,581,430 A | * | 4/1986 | Phan et al. | 526/246 |
| 4,612,336 A | | 9/1986 | Yada et al. | |
| 4,740,533 A | | 4/1988 | Su et al. | |
| 4,746,690 A | * | 5/1988 | Busch et al. | 524/27 |
| 4,863,647 A | * | 9/1989 | Baylor, Jr. | 264/425 |
| 4,874,827 A | * | 10/1989 | Kanluen et al. | 526/214 |
| 5,010,155 A | | 4/1991 | Mueller | |
| 5,034,461 A | | 7/1991 | Lai et al. | |
| 5,070,215 A | | 12/1991 | Bambury et al. | |
| 5,185,385 A | * | 2/1993 | Kanluen et al. | 522/84 |
| 5,667,735 A | | 9/1997 | Bae et al. | |
| 5,779,943 A | | 7/1998 | Enns et al. | |
| 5,912,470 A | | 6/1999 | Eibofner et al. | |
| 5,938,795 A | | 8/1999 | Molock et al. | |
| 6,039,899 A | | 3/2000 | Martin et al. | |
| 6,087,415 A | | 7/2000 | vanderlaan et al. | |
| 6,248,266 B1 | | 6/2001 | Gartley | |
| 6,486,262 B1 | | 11/2002 | Suzuki et al. | |
| 6,551,531 B1 | | 4/2003 | Ford et al. | |
| 6,632,887 B2 | | 10/2003 | LeBoeuf et al. | |
| 6,832,887 B2 | | 12/2004 | Baer et al. | |

FOREIGN PATENT DOCUMENTS

| | | |
|---|---|---|
| EP | 0 080 539 A1 | 6/1983 |
| EP | 0362137 A2 | 4/1990 |
| JP | 55-50002 | 4/1980 |
| JP | 63278910 | 11/1988 |
| JP | 10-231309 | 9/1998 |
| JP | 2003212917 | 7/2003 |
| WO | WO 00/04078 A1 | 1/2000 |

OTHER PUBLICATIONS

PCT International Search Report, dated Mar. 22, 2006, for PCT Int'l. Appln. No. PCT/US2005/037473.

Crivillo, J.V. & K. Dietliker Photoinitiators For Free Radical Cationic & Anionic Photopolymerization, 1998, pp. 275-298, vol. III, 2nd Edition; Edited By G. Bradley; John Wiley And Sons, London, United Kingdom.

Odian, Principles Of Polymerization, 3rd Edition, 1991, p. 252, John Wilyey & Sons, Canada.

Green, The Sigma-Aldrich Handbook Of Stains, Dyes And Indicators, 1990, pp. 763-776, Aldrich Chemical Company, Inc., Milwaukee, Wisconsin, USA.

* cited by examiner

*Primary Examiner*—Sanza L McClendon

(57) ABSTRACT

The present invention relates to a process comprising polymerizing via irradiation from a light source, a reaction mixture comprising at least one monomer and at least one photoinitiator wherein at least about 90% of incident light emitted by the light source is filtered to produce a soluble, high molecular weight polymer.

28 Claims, 2 Drawing Sheets

PROCESS FOR THE SYNTHESIS OF SOLUBLE, HIGH MOLECULAR WEIGHT POLYMERS

RELATED APPLICATIONS

The present application is a continuation-in-part of U.S. Ser. No. 09/921,192, filed on Aug. 2, 2001.

FIELD OF THE INVENTION

The present invention relates to processes for the synthesis of soluble, high molecular weight polymers.

BACKGROUND OF THE INVENTION

Methods for the manufacture of soluble polymers having molecular weights less than about 700,000 are well known. For example, soluble polyHEMA possessing molecular weights in the range of 500,000 to 700,000 mass units may be accomplished by reacting concentrated solutions of one or more olefinic monomers in the presence of radical initiators, followed by the termination of the process once a gel has been formed. Unfortunately, this process often yields inconsistent results. Furthermore, depending on the crosslinker content of HEMA used in their syntheses, these compounds may consist of significant branching in the polymeric chains. This branching reduces the solubility of the resultant polyHEMA.

SUMMARY OF THE INVENTION

The present invention relates to a method comprising polymerizing at least one monomer under conditions where at least about 95% of the incident light produced by the light source is filtered to produce a soluble, high molecular weight polymer.

More specifically, the present invention relates to a process comprising polymerizing via irradiation from a light source, a reaction mixture comprising at least one monomer and at least one photoinitiator wherein at least about 90% of incident light emitted by the light source is filtered to produce a soluble, high molecular weight polymer.

DESCRIPTION OF THE INVENTION

Figure 1:
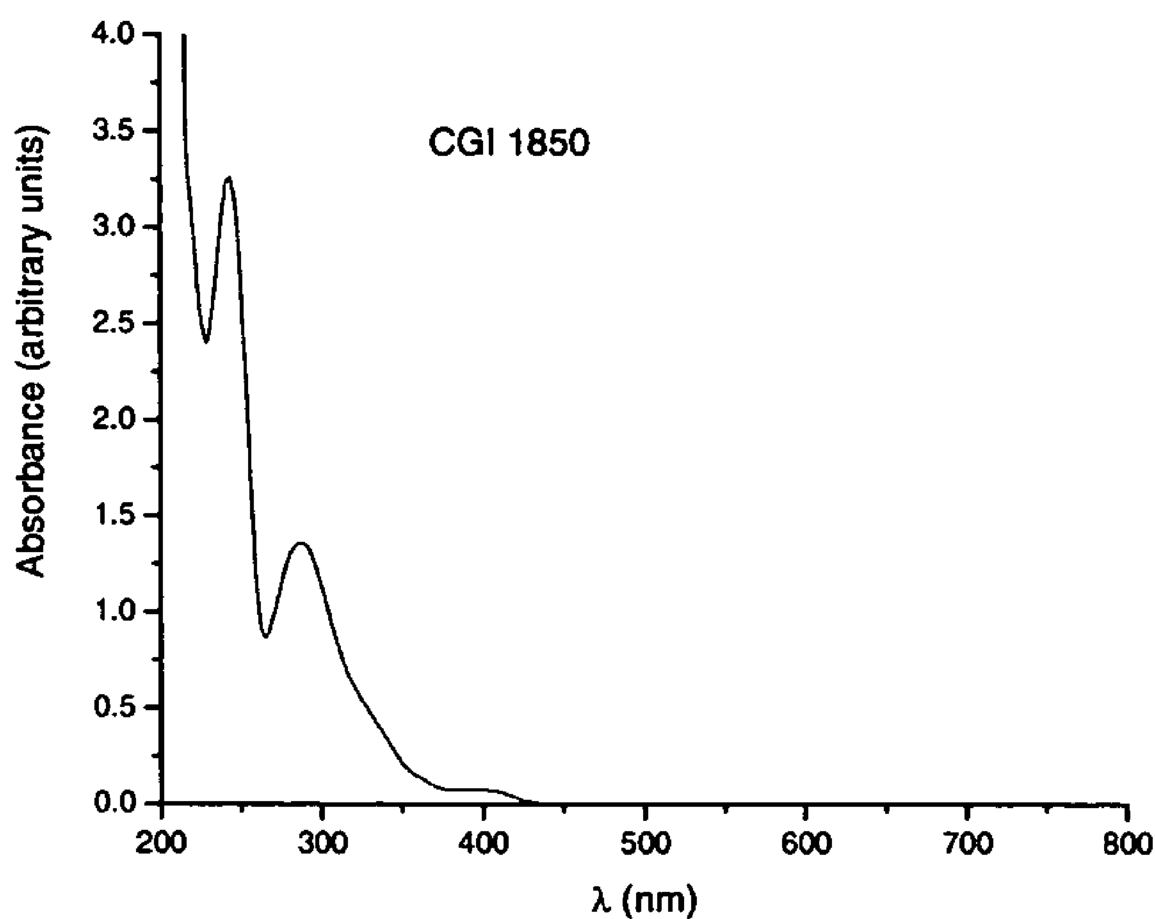
FIG. 1 is the absorbance spectrum for IRGACURE CGI 1850.

It has been surprisingly found that by controlling the intensity of incident light to polymerizable systems the rate of initiation may be manipulated to conveniently produce soluble polymers having high molecular weights.

As used herein "soluble" means that the resulting polymer has a low degree of crosslinking. Suitable degrees of crosslinking include those below about 0.1%, preferably below about 0.08% and more preferably below about 0.06%. Alternatively, the solubility may be confirmed by dissolving the polymer in a solvent having a similar degree of polarity. Suitable solvents may be readily selected by those of skill in the art, using for example dielectric constants, dipole moment of the solvent, Hansen solubility parameters and the like. Suitable solvents for polar polymers, such as polyHEMA include, but are not limited to dimethylformamide, dimethylsulfoxide, ethyl lactate, water, methanol, isopropyl alcohol, ethanol, mixtures thereof and the like at 25° C. Suitable solvents for non-polar polymers, such as methyl methacrylate include, but are not limited to toluene, methylene chloride and the like at 25° C. Polymers which are soluble under the present invention will have at least about 0.5 gm of polymer dissolve in 100 ml of the selected solvent at 25° C. Additionally, the soluble, high molecular weight polymers of the present invention may have polydispersities from about 1.4 to about 1.8, more preferably between about 1.1 to about 1.5. As used herein "high molecular weight" means a weight average molecular weight Mw of at least about 400,000 and preferably at least about 500,000 as measured by GPC with absolute molecular weight determination using a multiangle light scattering detector. Appropriate instruments are available from Wyatt Technologies Any free radical polymerizable monomer(s) may be polymerized using the process of the present invention. Generally free radical polymerizble monomers comprise reactive groups including acrylates, styryls, vinyls, vinyl ethers, acrylamides, N-vinyllactams, N-vinylamides, $C_{2-12}$alkenyls, $C_{2-12}$alkenylphenyls, $C_{2-12}$alkenylnaphthyls, or $C_{2-6}$alkenylphenyl$C_{1-6}$alkyls. Preferred free radical polymerizable monomers comprise methacrylates, acrylates, methacrylamides, acrylamides, and the like, and more preferably $C_{1-6}$alkylacrylates and $C_{1-6}$alkylacrylamides in some embodiments. The free radical polymerizable monomer are monofunctional. More specifically suitable reactive groups include acrylic, methacrylic, acrylamido, methacrylamido, fumaric, maleic, styryl, isopropenylphenyl, O-vinylcarbonate, O-vinylcarbamate, allylic, O-vinylacetyl and N-vinyllactam and N-vinylamido double bonds. "Acrylic-type" or "acrylic-containing" monomers are those monomers containing the acrylic group $$(CR'H{=}CRCOX)$$

wherein R' is H or $CH_3$, R is H, alkyl or carbonyl, and X is O or N, which are also known to polymerize readily, such as N,N-dimethylacrylamide (DMA), 2-hydroxyethyl acrylate, 2-hydroxyethyl methacrylate, glycerol methacrylate, 2-hydroxyethyl methacrylamide, polyethyleneglycol monomethacrylate, methacrylic acid, acrylic acid and mixtures thereof.

Free radical reactive monomers may also include monomers such as N-vinyl lactams (e.g. N-vinyl pyrrolidone (NVP)), N-vinyl-N-methyl acetamide, N-vinyl-N-ethyl acetamide, N-vinyl-N-ethyl formamide, N-vinyl formamide, N-2-hydroxyethyl vinyl carbamate, N-carboxy-β-alanine N-vinyl ester, with NVP being preferred.

Still further examples are the hydrophilic vinyl carbonate or vinyl carbamate monomers disclosed in U.S. Pat. No. 5,070,215, and the hydrophilic oxazolone monomers disclosed in U.S. Pat. No. 4,190,277. Other suitable hydrophilic monomers will be apparent to one skilled in the art.

More preferred free radical reactive monomers which may be incorporated into the polymer of the present invention include N,N-dimethyl acrylamide (DMA), 2-hydroxyethyl acrylate, glycerol methacrylate, 2-hydroxyethyl methacrylamide, N-vinylpyrrolidone (NVP), 2-hydroxyethyl methacrylate, and polyethyleneglycol monomethacrylate.

Silicon containing monomers may also be included. Suitable silicon containing monomers include at least one [—Si—O—Si] group. Preferably, the Si and attached O are present in the silicone-containing component in an amount greater than 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, N-vinyl lactam, N-vinylamide, and styryl functional groups. Examples of silicone-containing components which are useful in this invention may be found in U.S. Pat. Nos. 3,808,178; 4,120,570; 4,136,250; 4,153,641; 4,740,533; 5,034,461 and 5,070,215, and EP080539. All of the patents cited herein are hereby incorporated in their entireties by reference. These references disclose many examples of olefinic silicone-containing components.

Further examples of suitable silicone-containing monomers are polysiloxanylalkyl(meth)acrylic monomers represented by the following formula:

Formula I

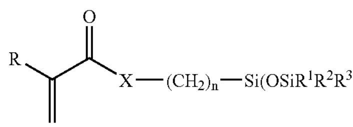

wherein: R denotes H or lower alkyl; X denotes O or $NR^4$; each $R^4$ independently denotes hydrogen or methyl, each $R^1$-$R^3$ independently denotes a lower alkyl radical or a phenyl radical, and n is 1 to 10 and preferably 1 or 3 to 10.

Examples of these polysiloxanylalkyl(meth)acrylic monomers include methacryloxypropyl tris(trimethylsiloxy)silane, pentamethyldisiloxanyl methylmethacrylate, and methyldi(trimethylsiloxy)methacryloxymethyl silane. Methacryloxypropyl tris(trimethylsiloxy)silane is the most preferred.

One preferred class of silicone-containing components is a poly(organosiloxane)prepolymer represented by Formula II:

Formula II

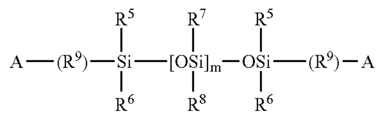

wherein each A independently denotes an activated unsaturated group, such as an ester or amide of an acrylic or a methacrylic acid or an alkyl or aryl group (providing that one A comprises an activated unsaturated group capable of undergoing radical polymerization); each of $R^5$, $R^6$, $R^7$ and $R^8$ are independently selected from the group consisting of a monovalent hydrocarbon radical or a halogen substituted monovalent hydrocarbon radical having 1 to 18 carbon atoms which may have ether linkages between carbon atoms;

$R^9$ denotes a divalent hydrocarbon radical having from 1 to 22 carbon atoms, and m is 0 or an integer greater than or equal to 1, and preferable 5 to 400, and more preferably 10 to 300. One specific example is α,ω-bismethacryloxypropyl poly-dimethylsiloxane. Another preferred example is mPDMS (monomethacryloxypropyl terminated mono-n-butyl terminated polydimethylsiloxane).

Another useful class of silicone containing components includes silicone-containing vinyl carbonate or vinyl carbamate monomers of the following formula:

Formula III

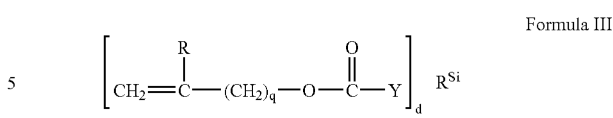

wherein: Y denotes O, S. or NH; $R^{Si}$ denotes a silicone-containing organic radical; R denotes hydrogen or methyl; d is 1, and q is 0 or 1. Suitable silicone-containing organic radicals $R^{Si}$ include the following:

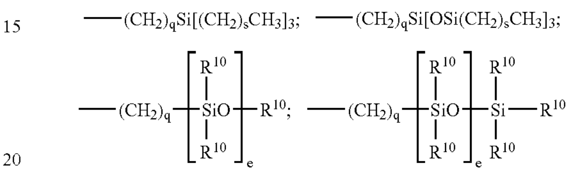

wherein:

$R^{10}$ denotes

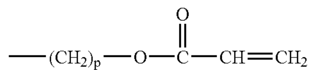

Wherein p is 1 to 6; or an alkyl radical or a fluoroalkyl radical having 1 to 6 carbon atoms; e is 1 to 200; q is 1, 2, 3 or 4; and s is 0, 1, 2, 3, 4 or 5.

The silicone-containing vinyl carbonate or vinyl carbamate monomers specifically include: 1,3-bis[4-(vinyloxycarbonyloxy)but-1-yl]tetramethyl-isiloxane3-(vinyloxycarbonylthio)propyl-[tris(trimethylsiloxysilane]; 3-[tris(trimethylsiloxy)silyl]propyl allyl carbamate; 3-[tris(trimethylsiloxy)silyl]propyl vinyl carbamate; trimethylsilylethyl vinyl carbonate; trimethylsilylmethyl vinyl carbonate, and The selected monomers must be essentially free from crosslinking compounds. As used herein, a crosslinking compound is any multifunctional compound which, because of it reactivity, is reactive under the polymerization conditions of the present invention. It should be understood that multifunctional compounds which are not reactive under the polymerization conditions selected may be present in amounts above those specified herein. The amount of crosslinker which may be tolerated will to some extent vary, depending upon the monomers which are being polymerized. Generally, the amount of crosslinker included in the reaction mixture should be less than about $6\times10^{-3}$ mole %, preferably less than about $5\times10^{-3}$ mole % and more preferably less than about $4\times10^{-3}$ mole %, based upon all reactive components in the reaction mixture. When the monomers comprise a polydimethylsiloxane, such as mPDMS, the amount may be higher such as less than about 2 mole %, preferably less than about 0.5 mole % and more preferably less than about 0.2 mole %.

The rate of initiation used for the present invention should be selected such that rate chain propagation remains greater than the combined rates of chain termination and chain transfer.

We have found that the desired rate of chain propagation may be readily achieved by controlling the amount of incident light which reaches the polymerization mixture. The incident light may be controlled by a number of ways known in the art.

For example, filters, such as glass and solution filters may be used alone or in combination to reduce the intensity from the light source. The filter is selected according to the spectrum of the light source and the spectrum of the initiator used in the polymerization. Generally the filter is selected to (a) cut off wavelengths below about 400 nm and greater than about 525 nm, and (b) give about 5% to about 60% of maximum transmittance around about 450 nm and about 10% to about 20% at about 420 nm. The thickness of the glass filter varies from about 1 mm to about 5 mm. The dimensions of the glass filter should be greater than the dimensions of the reaction vessel to insure that all light entering the vessel passes through the filter. An example of a suitable glass filter is a SCHOTT glass filter VG6 (1 mm or 2 mm thickness). Alternatively a filter dye may be used. The absorbance spectrum of several filter dyes may be found in The Sigma-Aldrich Handbook of Stains, Dyes and Indicators, Floyd J. Green, The Adrich Chemical Company, 1990. Examples of filter dyes which absorb in the region between about 350 nm and 400 nm include amaranth, Reactive Blue 4 and blue HEMA, which is disclosed in U.S. Pat. No. 5,938,795.

The distance between the light source and the polymerization mixture may vary up to about 12 inches Suitable filters block at least about 95% of the incident light produced by the light source, and preferably in some embodiments at least about 98%, and even more preferably at least about 99%.

The incident light may be measured using known equipment, such as commercially available spectral radiometers, such as an International Light (Newburyport, Mass.) IL 1400A radiometer equipped with a model XRL 140A sensor.

Suitable light sources should emit at least about 1 milliwatt of power and have an emission spectra which overlaps at least in part with the absorbance spectra of the selected photoinitiator(s).

Figure 2:
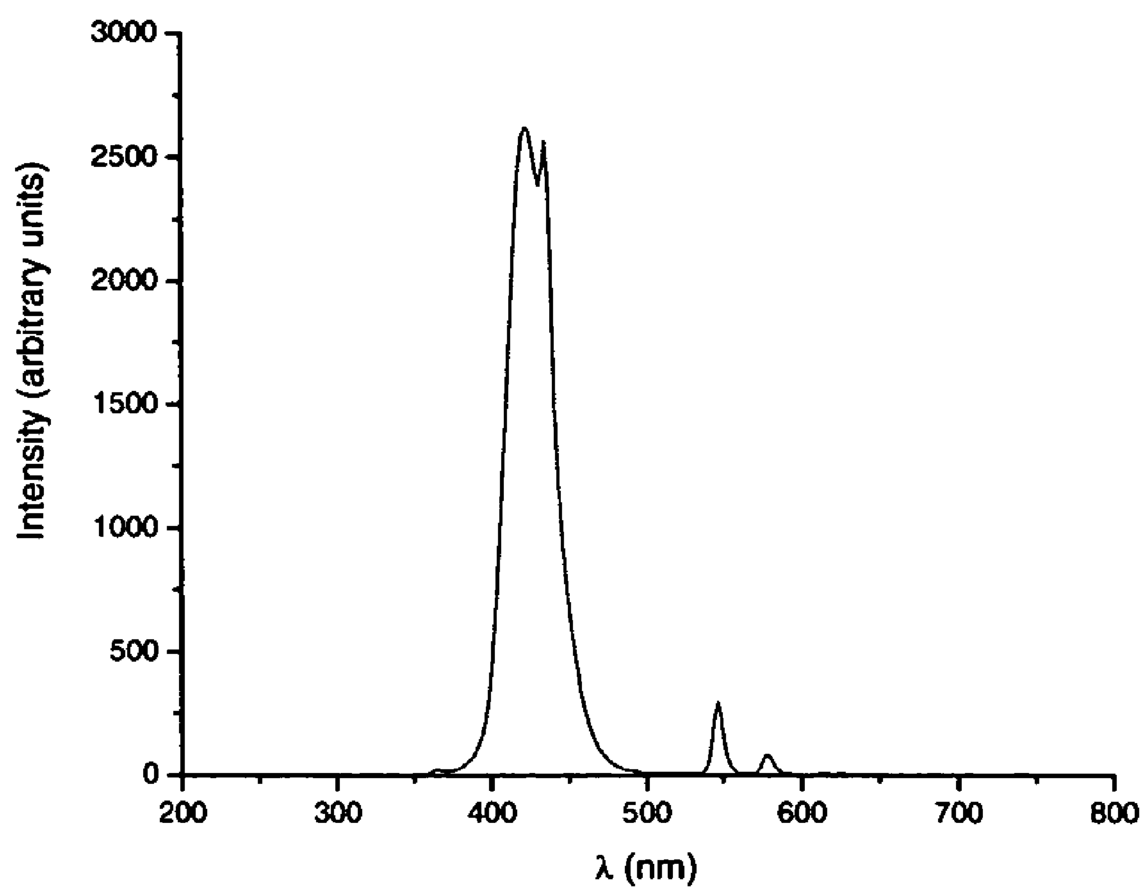
FIG. 2 shows the emission spectrum of a Phillips TL03 bulb.

The free radical polymerizable monomers are dissolved in a solvent with a photoinitiator. The photoinitiator is selected by reference to its absorbance spectrum and the spectral output of the light source. Specifically, the photoinitiator and light source are selected so that the light source emits radiation in at least one region of the absorbance spectrum of the photoinitiator. For example, FIG. 1 shows the absorbance spectrum for IRGACURE CGI 1850 (commercially available from Ciba Specialty Chemicals) and FIG. 2 shows the emission spectrum of a Phillips TL03 bulb. Comparing the Figures, it can be seen that there is an overlap of the photoinitiator absorbance spectrum and the lamp emission spectrum between about 375 and about 425 nm. Thus, IRGACURE CGI 1850 and a Phillips TL03 bulb may be used in the process of the present invention. Those of skill in the art, using the teaching of the present invention can readily select other suitable light source/photoinitiator combinations. Both UV and visible light activated photoinitiators may be suitable for the present invention. Suitable photoinitiator systems include aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphineoxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N, N-dimethylamino)benzoate. Commercially available visible light initiator systems include Irgacure 819, Irgacure 1700, Irgacure 1800, Irgacure 819, Irgacure 1850 (all from Ciba Specialty Chemicals) and Lucirin TPO initiator (available from BASF). Commercially available UV photoinitiators include Darocur 1173 and Darocur 2959 (Ciba Specialty Chemicals). These and other photoinitators which may be used are disclosed in Volume III, Photoinitiators for Free Radical Cationic & Anionic Photopolymerization, $2^{nd}$ Edition by J. V. Crivello & K. Dietliker; edited by G. Bradley; John Wiley and Sons; New York; 1998, which is incorporated herein by reference. The initiator is used in the reaction mixture in effective amounts to initiate photopolymerization of the reaction mixture, e.g., from about 0.01 to about 5 parts per 100 molar parts of reactive monomer. Alternatively, initiation can be conducted without a photoinitiator using, for example, e-beam. Preferred initiators include bisacylphosphine oxides, such as bis(2,4,6-trimethylbenzoyl)-phenyl phosphine oxide (Irgacure 819®) or a combination of 1-hydroxycyclohexyl phenyl ketone and bis(2,6-dimethoxybenzoyl)-2,4-4-trimethylpentyl phosphine oxide (DMBAPO), and the preferred method of polymerization initiation is visible light. The most preferred is bis(2,4,6-trimethylbenzoyl)-phenyl phosphine oxide (Irgacure 819®).

The reaction solvent should be selected to solubilize the monomers selected as well as the polymer as it is formed during the reaction. Suitable reaction solvents may be selected by Hanssen solubility parameters, dielectric constant, polarity and combinations thereof. Additionally solvents should have low chain transfer coefficients, such as those up to about 10, preferably up to about 5 and more preferably up to about 1, all relative to styrene at 60° C. Chain transfer coefficients are disclosed in Principles of Polymerization, Odian, John Wiley & Sons, 1991, pg 252. The chosen solvent (and any impurities) also should not significantly absorb light in the chosen wavelength region and should be free from contaminants which might react with the selected photoinitiator. Where HEMA is a monomeric component suitable solvents include ethylene glycol, dimethylformamide, dimethylsulfoxide, glycerine and mixtures thereof with ethylene glycol being preferred.

The reaction is conducted with a reaction effective amount of solvent. The minimum amount of reaction solvent to be used is the amount necessary to prevent gellation of reaction mixture. The upper range of reaction solvent is the amount necessary to provide the molecular weights specified herein. For example, when 2-HEMA is used as a monomer reaction effective amounts of reaction solvent include amounts sufficient to provide solutions between about 1 M and about 3 M.

The reaction temperature is controlled to maintain the solubility of the reactants and products in the solvent. Again using reactive mixtures containing HEMA as a component, reaction temperatures of at least about 10° C. and preferably from about 10° C. to about 75° C. may be used. Temperatures for other reactive components may be readily determined by those of skill in the art, using the teaching of the present invention.

Generally the process of the present invention is continued until the desired molecular weight is achieved. Suitable reaction times include up to about 2 hours and preferably from about 10 minutes to about 1 hour.

These examples do not limit the invention. They are meant only to suggest a method of practicing the invention. Those knowledgeable in contact lenses as well as other specialties may find other methods of practicing the invention. However, those methods are deemed to be within the scope of this invention.

Molecular weight distribution was determined by light scattering using the following instrument parameters:

Instrument: HPLC

Injection volume: 20 uL
Flow Rate: 0.5 mL/min
Detection: RI and Mini Dawn (Light Scattering) or compatible
Column: Phenomenex Phenogel 5u Linear (2) 300×7.8 mm or equivalent
Column Oven Temp: 60° C.
Eluent A: 0.2% Li Br in DMF (use soln filtered by 0.2 um nylon membrane)
Elution Profile: Isocratic
Run Time: 42 Minutes 0.03 g Polystyrene (28 KDa, 1000 KDa) and polyHEMA (355 KDa) standards were prepared in 5 ml of 0.2% Li Br in DMF. 0.02 g samples of the polymer were added to 5.00 mL 0.2% Li Br in DMF via pipette. The polymer samples were sonicated and/or heated until dissolved. The sample is injected into the HPLC and the procedure outlined in Astra Manual for analyzing light scattering data was used to determine molecular weight and polydispersity by Astra Software.

The absorbance spectrum of the photoinitiator used in the photopolymerization was measured using a commercially available spectrometers capable of measurements in the ultraviolet and visible regions of the electromagnetic spectrum, such as a Spec 55 made by Perkin Elmer. The absorbance spectrum of a commercially available photoinitiator, Darocur 1173, is shown in FIG. 2.

The absorbance spectrum of the filter dye may measured using a UV/VIS spectrometer, described above. More conveniently, the absorbance spectrum of the filter dye can be found in *The Sigma-Aldrich Handbook of Stains, Dyes and Indicators* by Floyd J. Green published by the Aldrich Chemical Company in 1990. The absorbance spectrum of a commercially available dye, amaranth, is shown in FIG. 3.

The following apparatus was used in the Examples. The exterior sides of a 4 quart colorless Pyrex dish were wrapped in silver reflective tape to prevent light from entering the system from the sides and to increase reflectivity within the dish. The Pyrex dish was placed on a mirror during the reaction to further increase reflection within the dish. The top edges of the dish are sealed with foam insulation tape (4 $mm^2$ strips) to provide a seal between the dish and the filter glass, preventing light from entering the system at this juncture.

A filter glass cover was placed on top of the Pyrex dish. A sheet of 2 mm thick VG-6 filter glass (Schott Technologies, Inc.) large enough to cover the entire Pyrex dish was used as the cover. The filter glass was placed onto a sheet of 1/16 inch thick Pyrex optical glass for support, then placed over the Pyrex dish during the reaction. FIG. 1 illustrates the apparatus.

The following abbreviations are used in the examples below:

CGI1850 1:1 (wgt) blend of 1-hydroxycyclohexyl phenyl ketone and bis(2,6-dimethoxybenzoyl)-2,4-4-trimethylpentyl phosphine oxide Darocur 1173 2-hydroxy-2-methyl-1-phenyl-propan-1-one

EXAMPLE 1

2-Hydroxyethyl methacrylate (HEMA, containing 0.07 weight % ethylene glycol dimethacylate—"EGDMA", commercially available from Rohm, 538.56 g, 4.14 mol) and the initiator CGI1850 (commercially available from Ciba, 7.38 g) were added to a 2500 mL amber bottle. The bottle was capped and either rolled or agitated until a homogeneous solution was obtained. Ethylene glycol (Aldrich, 99+% spectrophotometric grade, 1998.1 g) was then added to the solution and the solution was rolled a further 10 minutes. The solution was then degassed for a minimum of one hour. The reaction apparatus described above was transferred to a glove box and the glove box was degassed at room temperature by putting it under a positive pressure of $N_2$. The glove box was monitored so that the $O_2$ level was ≦0.2% and a positive $N_2$ flow was maintained. The degassed HEMA/initiator solution in ethylene glycol was transferred to the glove box. This solution was poured into the Pyrex dish and placed on the mirror. The dish was centered under the light bulbs and the filter glass was placed on top of the dish with gentle pressure on top of the glass to ensure a good seal against the dish. The HEMA/initiator solution in ethylene glycol was allowed to cure for 1 hour under 4 evenly spaced TL-03 20W visible light bulbs, under the glove box conditions of $O_2$ level ≦0.2%, room temperature, and a positive $N_2$ flow. Immediately after one hour, the reaction mixture was transferred to a 4 L laboratory blender and worked up by blending the mixture on high in 3.5 L of de-ionized water for a minimum of two minutes. The polymer was then collected by filtration through blotting paper. The excess water was removed from the polymer by manually squeezing the water from the blotting paper. The work-up process of blending, filtering, and squeezing out excess water was performed a total of four times, to eventually yield a finely ground, white material. The polymer was dried at room temperature. The dried polymer was transferred to a small blender and ground. The ground polymer was washed for one hour in 2 L of de-ionized water, using overhead stirring. This washing procedure was repeated a second time. Excess water was squeezed out of the polymer after each wash. The resultant polyHEMA was dried at room temperature. After drying, the polyHEMA was ground down using a small blender yielding 245.4 g of a fine, white powder (46% yield).

EXAMPLE 2

A homogeneous mixture of 615 mg CGI 1850, 150 mL of ethylene glycol, and 45 g of HEMA was degassed by evacuating the system for several minutes, followed by purging with nitrogen. This process was continued for one hour, using 3 to 4 evacuate/purge sequences, and the mixture was placed under a nitrogen atmosphere.

104 gm of a solution of blue HEMA in ethylene glycol (0.9 g in 200 mL) was poured into a crystallizing dish having an inner diameter of 184.15 mm to provide a light filter. This cover was then placed on the silvered vessel described above, which had been charged with the reaction mixture. The junction of the reaction vessel and cover was tightly sealed using duct tape to avoid the penetration of any higher intensity light from the sides of the system.

The reaction was then exposed to visible light (4 Philips 20W/TL03 bulbs bulbs arranged parallel to each other and within a distance of 10-12 inches from the sample) for one hour at room temperature, after which it was quenched by rapidly diluting the mixture with water, followed by vigorous agitation while open to the atmosphere. The resultant white polymer was washed several times with 100 to 150 mL of de-ionized water until its texture remains consistent and no additional hardening was observed. The rubbery material was then torn into smaller pieces, and stirred in 300 mL of D.I. water for two hours. The liquids were decanted, and the water wash was repeated once more. The product was squeezed between blotting paper to remove excess water and placed in a rotary evaporator to remove the residual water at reduced pressure. The dried polymer was milled into fine particles prior to use.

GPC data was obtained using both refractive index and light scattering detectors. Chromatography was performed using a phenogel 5 μm linear (2) 7.8 mm×30 cm column (Phenomenex), and 0.5 wt. % lithium bromide in N,N-dimethylformamide as the eluent. Molecular weights were determined using polystyrene standards. Typical values obtained using low angle light scattering were: Mn=$2.9\times10^6$; Mw=$4.2\times10^6$, Mz=$6.5\times10^6$, polydispersity (Mw/Mn)=1.5.

EXAMPLES 3-8

Example 2 was repeated using the conditions and monomers listed in Table 2, below. TL03 bulbs were used for the 380-480 nm wavelengths and TL09 bulbs were used for the 300-400 nm wavelengths.

TABLE 1

| Ex. | Monomer(s) | Inhibitor (ppm) | λ(Nm) | Filter | Mw(D) | Pd | Yield (%) |
|---|---|---|---|---|---|---|---|
| 3 | HEMA | 14 | 380-480 | Y | >$2.5\times10^6$ | 1.63 | 42.1 |
| 4 | HEMA | 14 | 380-480 | N | $126\times10^3$ | 1.49 | 88.0 |
| 5 | HEMA | 14 | 300-400 | Y | Insoluble | | 3.1 |
| 6 | HEMA | 14 | 300-400 | N | $145\times10^3$ | 1.77 | 93.3 |
| 7 | HEMA:GMMA, 9:1 wt | 17 | 380-480 | Y | $3.34\times10^6$ | 1.47 | 49.8 |
| 8 | HEMA + 2 wt % BHEMA | 14 | 380-480 | NA | $1.43\times10^6$ | 1.71 | 58.0 |

GMMA = glycerol monomethacrylate, BHEMA = Blue HEMA

The highest molecular weight soluble polymers were produced in Examples 3 and 7 (TL03 bulbs with a blue HEMA filter). As can be seen from Table 1, this process is also amenable to the preparation of random copolymers.

Yields of polymers made using blue HEMA filters and TL09 bulbs (Examples 3 and 7) were poor in comparison to those made using the TL03 bulbs (with or without the blue HEMA filter)—Examples 5 and 6. As shown in FIG. 2, the emission intensity at wavelengths greater than 400 nm of the visible light bulbs (TL03) is much greater than that of the TL09 bulbs. With the drop in absorbance of blue HEMA after 400 nm, it is this higher wavelength of light that is exploited to trigger homolysis of DMBAPO. Given the data, only the TL03 bulbs—or bulbs that emit light at wavelengths greater than 400 nm—would be effective in working with a filter such as blue HEMA.

EXAMPLE 9

To a 250 mL amber bottle were added 45 g HEMA, 150 mL ethylene glycol and 200 mg Darocur 1173. The mixture was stirred by rolling for 4 hours. The mixture was degassed for 1 hour using a vacuum pump, with $N_2$ purging, four times for 10-15 seconds each during degas. In a glove box under positive $N_2$ the mixture was poured into an 8 cm radius silvered dish. The reaction vessel was covered with a solution filter prepared by dissolving 250 mg Amaranth in 200 mL ethylene glycol and filtering using #1 filter paper. The filter solution (105 g) was poured into the reaction vessel described in Example 2. The dish containing the solution filter was placed on top of the reaction vessel. The reaction vessel was placed 10-12 inches from 4 20W TL-09 UV light bulbs and cured in glove box for 1 hour at room temperature, positive $N_2$, $O_2$<0.01%.

The resulting polymer was worked up in a blender, blending four times in 500 mL portions of DI $H_2O$. The product was washed by stirring in 500 mL of DI $H_2O$ for 24 hours. The water was squeezed from the product with blotting paper and dried overnight. The product was ground down using a blender, washed in 500 mL DI $H_2O$ for 3 hours and dried overnight. The wash and drying was repeated once. The product was ground down after the final wash. The product had a Mn of 2,430,000; a Mw of 2,780,000, and a Mw/Mn of 1.15. A polymer which was made under the same conditions but without an aramanth filter had the following molecular weight Mn of 310,000; Mw of 400,000 and Mw/Mn of 1.27

We claim:

1. A process comprising polymerizing via irradiation from a light source, a reaction mixture comprising at least one monomer and at least one photoinitiator wherein at least about 90% of incident light emitted by the light source is filtered to produce a soluble, high molecular weight polymer.

2. The process of claim 1 wherein said at least one monomer is selected from the group consisting of methacrylates, acrylates, methacrylamides, acrylamides and mixtures thereof.

3. The process of claim 1 wherein said at least one monomer is selected from the group consisting of N,N-dimethylacrylamide, 2-hydroxyethyl acrylate, 2-hydroxyethyl methacrylate, glycerol methacrylate, 2-hydroxyethyl methacrylamide, polyethyleneglycol monomethacrylate, methacrylic acid, acrylic acid, N-vinyl lactams, N-vinyl-N-methyl acetamide, N-vinyl-N-ethyl acetamide, N-vinyl-N-ethyl formamide, N-vinyl formamide, N-2-hydroxyethyl vinyl carbamate, N-carboxy-β-alanine N-vinyl ester, hydrophilic vinyl carbonate monomers, hydrophilic vinyl carbamate monomers, hydrophilic oxazolone monomers, silicone containing monomers and mixtures thereof.

4. The process of claim 1 wherein said at least one monomer is selected from the group consisting of N, N-dimethylacrylamide, N-vinyl pyrrolidinone, 2-hydroxyethyl-methacrylate, glycerol monomethacrylate, methacrylic acid, methacrylic acid 2-hydroxyethyl acrylate, 2-hydroxyethyl methacrylamide, N-vinylpyrrolidone, polyethyleneglycol monomethacrylate and mixtures thereof.

5. The process of claim 1 further comprising dissolving said at least one monomer in a solvent to form a reaction mixture and degassing said reaction mixture prior to said polymerizing.

6. The process of claim 1 wherein said polymer has a weight average molecular weight of greater than about 400,000.

7. The process of claim 1 wherein said polymer has a weight average molecular weight of greater than about 500,000.

8. The process of claim 1 wherein said reaction mixture comprises less than about $6\times10^{-3}$ mole %, difunctional components, %, based upon all rcactivc components in the reaction mixture.

9. The process of claim 1 wherein said reaction mixture comprises less than about $4\times10^{-3}$ mole %, based upon all reactive components in the reaction mixture.

10. The process of claim 1 wherein said filter filters at least about 95% of the incident light from said light source.

11. The process of claim 10 wherein said filter filters at least about 98% of the incident light from said light source.

12. The process of claim 1 wherein said incident light is filtered by at a filter comprising least one glass filter, solution filter or combinations thereof.

13. The process of claim 1 wherein said reaction mixture further comprises at least one solvent.

14. A process comprising the steps of polymerizing a reaction mixture comprising at least one solvent, at least one free radical polymerizable monomer, less than $6\times10^{-3}$mole % multifunctional compounds and at least one photoinitiator, using a light source and at least one filter which filters at least about 90% of incident light from said light source, under conditions sufficient to produce a substantially linear, soluble high molecular weight polymer.

15. The process of claim 14 wherein said filter filters at least about 95% of the incident light from said light source.

16. The process of claim 14 wherein said filter filters at least about 98% of the incident light from said light source.

17. The process of claim 14 wherein said at least one monomer is selected from the group consisting of methacrylates, acrylates, methacrylamides, acrylamides and mixtures thereof.

18. The process of claim 1 wherein said at least one monomer is selected from the group consisting of N,N-dimethylacrylamide, 2-hydroxyethyl acrylate, 2-hydroxyethyl methacrylate, glycerol methacrylate, 2-hydroxyethyl methacrylamide, polyethyleneglycol monomethacrylate, methacrylic acid, acrylic acid, N-vinyl lactams, N-vinyl-N-methyl acetamide, N-vinyl-N-ethyl acetamide, N-vinyl-N-ethyl formamide, N-vinyl formamide, N-2-hydroxyethyl vinyl carbamate, N-carboxy-β-alanine N-vinyl ester, hydrophilic vinyl carbonate monomers, hydrophilic vinyl carbamate monomers, hydrophilic oxazolone monomers, silicone containing monomers and mixtures thereof.

19. The process of claim 14 wherein said at least one monomer is selected from the group consisting of N,N-dimethylacrylamide, N-vinyl pyrrolidinone, 2-hydroxyethylmethacrylate, glycerol monomethacrylate, methacrylic acid, methacrylic acid 2-hydroxyethyl acrylate, 2-hydroxyethyl methacrylamide, N-vinylpyrrolidone, polyethyleneglycol monomethacrylate and mixtures thereof.

20. The process of claim 14 further comprising dissolving said at least one monomer in a solvent to form a reaction mixture and degassing said reaction mixture prior to said polymerizing.

21. The process of claim 14 wherein said polymer has a weight average molecular weight of greater than about 400,000.

22. The process of claim 14 wherein said polymer has a weight average molecular weight of greater than about 500,000.

23. The process of claim 14 wherein said reaction mixture comprises less than about $1.6\times10^{-3}$ mole % difunctional components, based upon all reactive components in the reaction mixture.

24. The process of claim 14 wherein said reaction mixture comprises less than about $1\times10^{-5}$ mole %, based upon all reactive components in the reaction mixture.

25. The process of claim 14 wherein said incident light is filtered by at a filter comprising least one glass filter, solution filter or combinations thereof.

26. The process of claim 1 wherein said filter cuts off light having wavelengths below about 400 nm and above about 525 nm.

27. The process of claim 15 wherein said filter cuts off light having wavelengths below about 400 nm and above about 525 nm.

28. The process of claim 1 wherein said reaction mixture comprises less than about $5\times10^{-3}$ mole % difunctional components, based upon all reactive components in the reaction mixture.

* * * * *